(12) United States Patent
Nakamura (10) Patent No.: US 8,009,445 B2
(45) Date of Patent: Aug. 30, 2011

(54) SWITCHING POWER SOURCE APPARATUS (75) Inventor: Masaru Nakamura, Niiza (JP)

(73) Assignee: Sanken Electric Co., Ltd., Niiza-shi (JP)

( * ) Notice: Subject to any disclaimer, the term of this patent is extended or adjusted under 35 U.S.C. 154(b) by 345 days.

(21) Appl. No.: 12/212,285

(22) Filed: Sep. 17, 2008

(65) Prior Publication Data

US 2009/0103338 A1    Apr. 23, 2009

(30) Foreign Application Priority Data

Oct. 18, 2007    (JP) .................... 2007-271250

(51) Int. Cl.
*H02M 3/335*    (2006.01)
(52) U.S. Cl. ................................... 363/21.12
(58) Field of Classification Search .... 363/21.12–21.18, 363/49, 79, 89
See application file for complete search history.

(56) References Cited

U.S. PATENT DOCUMENTS

| | | | | |
|---|---|---|---|---|
| 5,151,907 A * | 9/1992 | Robbins | ............... | 714/22 |
| 6,462,972 B2 * | 10/2002 | Nagai et al. | ............... | 363/95 |
| 6,531,855 B2 * | 3/2003 | Miki et al. | ............... | 323/285 |
| 7,176,660 B2 * | 2/2007 | Usui et al. | ............... | 323/207 |
| 2007/0217234 A1 | 9/2007 | Nakamura | | |
| 2008/0175027 A1 | 7/2008 | Shimada et al. | | |

FOREIGN PATENT DOCUMENTS

JP    2005-328589    11/2005

OTHER PUBLICATIONS

U.S. Appl. No. 12/345,042, filed Dec. 29, 2008, Nakamura.

* cited by examiner

*Primary Examiner* — Adolf Berhane
*Assistant Examiner* — Yemane Mehari
(74) *Attorney, Agent, or Firm* — Oblon, Spivak, McClelland, Maier & Neustadt, L.L.P.

(57) ABSTRACT

A switching power source apparatus includes a switching element connected through a primary winding of a transformer to a voltage terminal of a DC input voltage, a rectifying-smoothing circuit to rectify and smooth a voltage induced by a secondary winding of the transformer and provide a DC output voltage, a control circuit for controlling ON/OFF of the switching element, and a delay circuit to generate a predetermined delay time. The control circuit detects the DC input voltage, starts a switching operation of the switching element if the DC input voltage has increased to or above a threshold value, and stops the switching operation of the switching element if the DC input voltage is lower than the threshold value and that a period during which the DC input voltage is continuously lower than the threshold value has reached the predetermined delay time.

10 Claims, 9 Drawing Sheets

SWITCHING POWER SOURCE APPARATUS

BACKGROUND OF THE INVENTION

1. Field of the Invention

The present invention relates to a switching power source apparatus that correctly detects a peak value of an AC voltage, and if the AC voltage is too low, stops the switching operation of a switching element to protect the switching element from breakage. Such a breakage may occur during an abnormal test of the switching power source apparatus, such as a brownout test that gradually decreases an AC voltage applied to the switching power source apparatus from a rated voltage and a brown-in test that gradually increases an AC voltage applied to the switching power source apparatus from a low voltage to the rated voltage. The breakage of the switching element may also occur with a poor power source that applies a low voltage to an AC input terminal of the switching power source apparatus, to cause the switching element to excessively increase its ON duty.

2. Description of the Related Art

There are some related arts disclosing switching power source apparatuses that include a switching element breakage protection to prevent a switching element from excessively increasing an ON duty when an AC voltage from an AC/DC converter decreases. These related arts detect an input voltage, and if the input voltage drops below a threshold value, determine that it is a low input state to stop the switching element.

Figure 1:
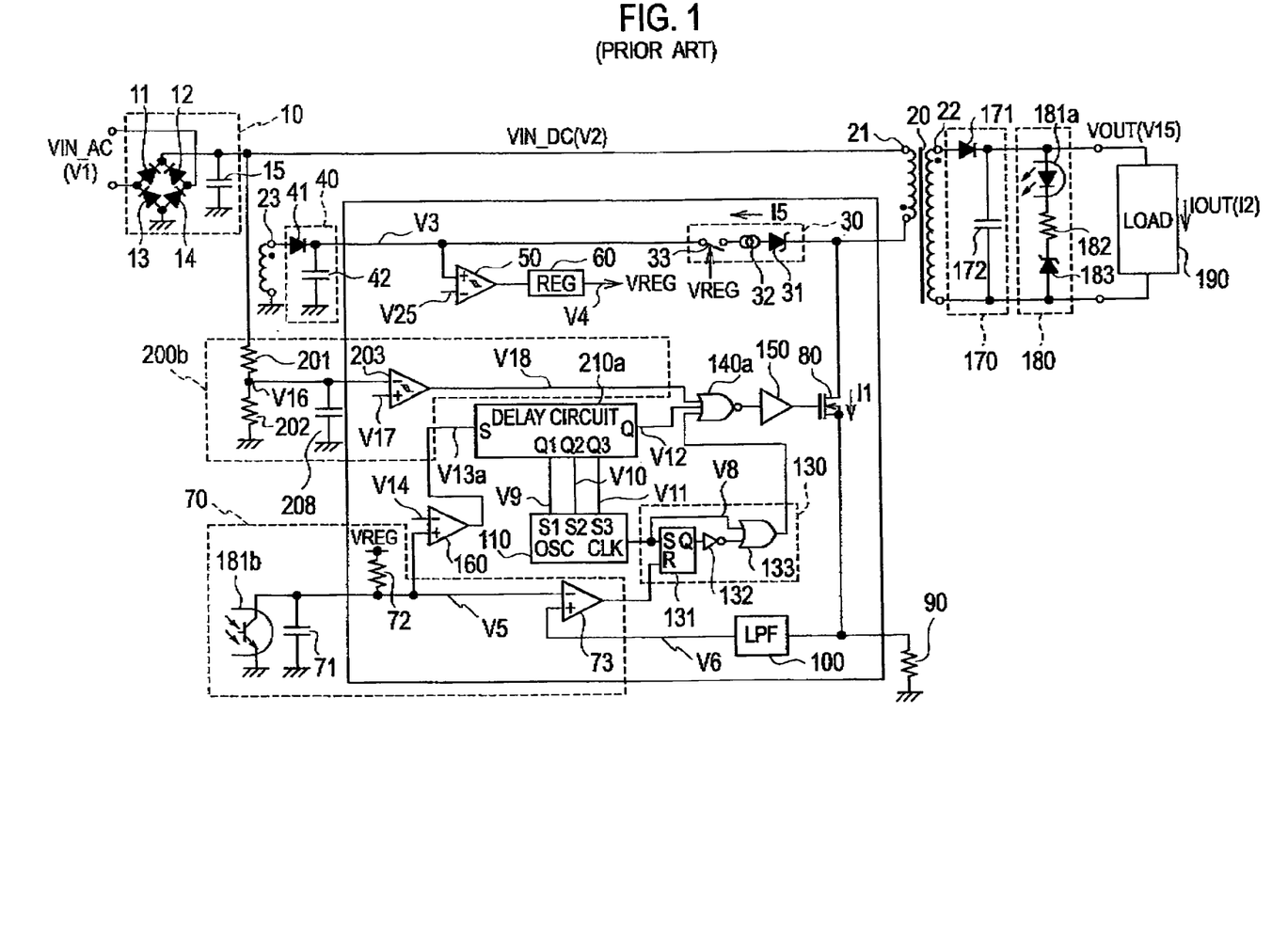
FIG. 1 is a circuit diagram showing a switching power source apparatus according to a related art.

FIG. 1 is a circuit diagram showing a switching power source apparatus according to one of such related arts. The apparatus includes an input rectifying-smoothing circuit 10, a transformer 20, a primary winding 21, a drive winding 23, a starter 30, a rectifying-smoothing circuit 40, a low-voltage-malfunction preventer 50, a reference voltage circuit 60, a feedback controller 70, a switching element 80, a current detecting resistor 90, a low-pass filter (LPF) 100, a first oscillator 110, a PWM controller 130, a NOR gate 140a, a driver 150, a comparator 160, a low-input protector 200a, a delay circuit 210a, a rectifying-smoothing circuit 170, an output voltage detector 180, and a load 190.

An end of the primary winding 21 of the transformer 20 is connected through the starter 30 and rectifying-smoothing circuit 40 to the drive winding 23 of the transformer 20.

The low-input protector 200a protects the switching element 80 from breakage due to a low voltage that is applied to an AC input terminal and excessively expands an ON duty of the switching element 80. Such a low voltage is applied during a brownout test or a brown-in test, or from an inferior power source.

The low-input protector 200a includes voltage dividing resistors 201 and 202 to divide a DC input voltage V2, a capacitor 208 to average AC ripple voltage superimposed on the DC input voltage V2, and a comparator 203 to compare a DC input divided voltage V16 with a threshold value V17.

Figure 2:
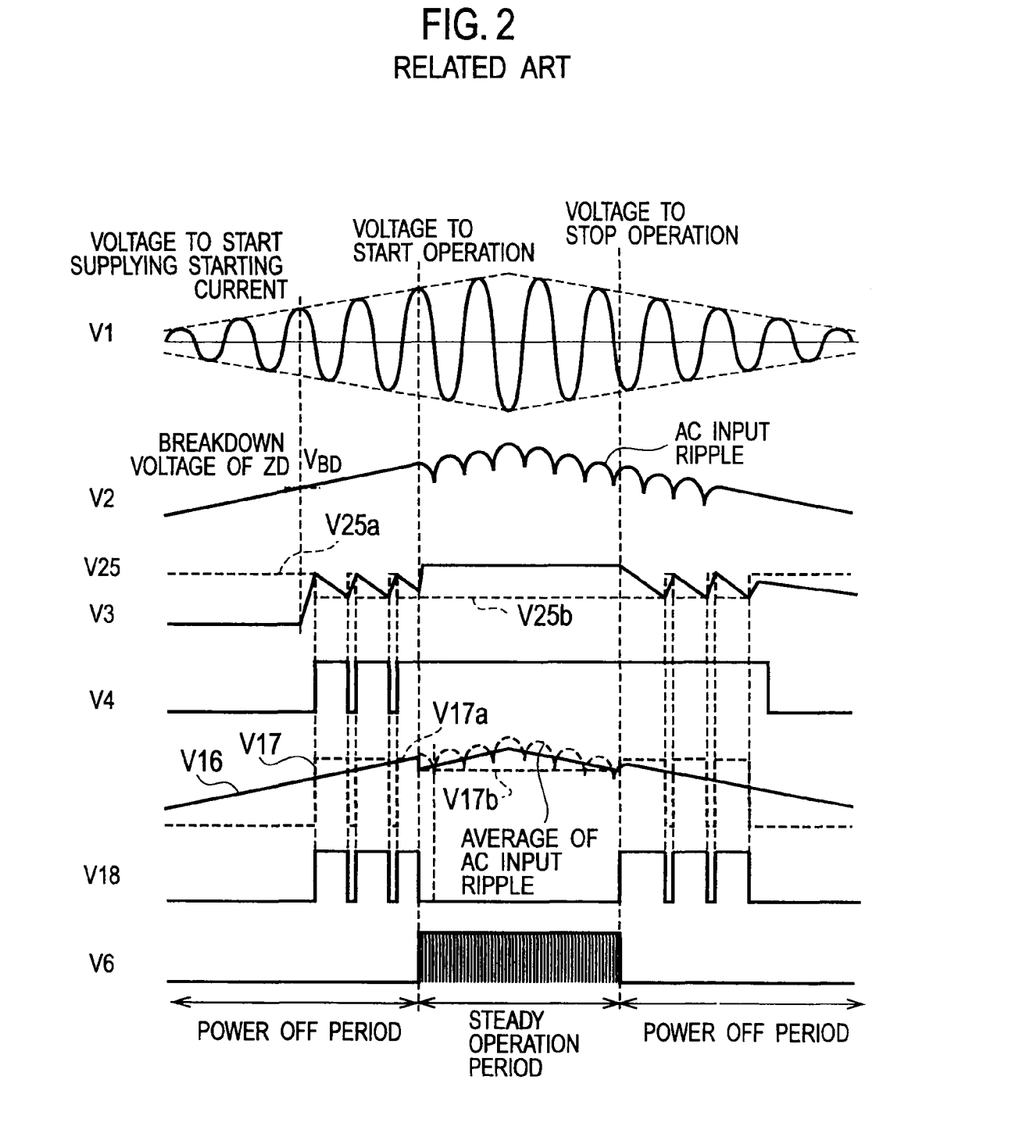
FIG. 2 is a timing chart showing an input detecting operation of the apparatus of FIG. 1.

The configuration and operation of each part of the related art shown in FIG. 1 will be explained with reference to the circuit diagram of FIG. 1 and a timing chart of FIG. 2. The input rectifying-smoothing circuit 10 includes diodes 11 to 14 to rectify an AC voltage V1 of an AC power source and a smoothing capacitor 15 to smooth the rectified voltage and provide a DC input voltage V2. The voltage V2 is supplied through the primary winding 21 of the transformer 20 to the switching element 80.

The switching element 80 conducts a switching operation, i.e., turns on/off to convert the DC input voltage V2 into an AC voltage to transfer energy from the primary side of the transformer 20 to the secondary side thereof. The rectifying-smoothing circuit 170 rectifies and smoothes a voltage generated by a secondary winding 22 of the transformer 20, to supply power to the load 190.

When the DC input voltage V2 increases to a breakdown voltage VBD of a Zener diode 31 in the starter 30, the Zener diode 31 breaks down to pass a starting current I5. The starting current I5 charges a capacitor 42 in the rectifying-smoothing circuit 40, to increase a power source voltage V3.

When the power source voltage V3 reaches a first threshold value V25a of the low-voltage-malfunction preventer 50, the reference voltage circuit (REG) 60 operates to supply a reference voltage V4 to each circuit block, and at the same time, turn off a switch 33 in the starter 30 to stop the starting current I5.

Operation when the AC voltage V1 increases from a low state as an inoperative state for power stoppage will be explained. In the low state, the DC input voltage V2 includes substantially no AC ripple voltage caused by the load 190.

In the low-input protector 200a, the voltage dividing resistors 201 and 202 divide the DC input voltage V2, to detect a DC input divided voltage V16 that is proportional to the AC voltage V1. The comparator 203 compares the DC input divided voltage V16 with a first threshold value V17a. If the DC input divided voltage V16 is equal to or larger than the first threshold value V17a, the comparator 203 determines that it is a steady input state, switches a first stop signal V18 from high to low, and provides the NOR gate 140a with the low-level signal V18, so that the switching element 80 may start the switching operation for a steady operation period.

Operation when the AC voltage V1 decreases from a high state as an operative state will be explained. In the power source operating state, the DC input voltage V2 includes superimposed ripple voltage that is caused by a primary-side load current and is synchronous with a period of the AC voltage V1. The AC ripple voltage varies in response to a secondary-side load current I2 and increases as the load current I2 increases. The DC input voltage V2 including the AC ripple voltage is divided by the voltage dividing resistors 201 and 202 into the voltage V16.

The comparator 203 compares the DC input divided voltage V16 averaged by the capacitor 208 with a second threshold value V17b. If the DC input divided voltage V16 is below the second threshold value V17b, the comparator 203 determines that it is a low input state and provides the NOR gate 140a with a high-level stop signal V18 to stop the switching operation of the switching element 80.

Another of the related arts is disclosed in Japanese Unexamined Patent Application Publication No. 2005-328589. This is a switching regulator control circuit including a first low-voltage-operation stop circuit to detect a first voltage value of input voltage and a second low-voltage-operation stop circuit to detect a second voltage value lower than the first voltage value. Depending on outputs from the first and second low-voltage-operation stop circuits, the switching regulator control circuit stops operation. One of the first and second low-voltage-operation stop circuits always operates to monitor a voltage value of input voltage.

SUMMARY OF THE INVENTION

According to the related art of FIG. 1, the DC input divided voltage V16 detected when the AC voltage V1 is decreasing is averaged by the smoothing capacitor 208 together with the superimposed AC ripple voltage. Accordingly, the voltage V16 is nonlinear with respect to the decreasing AC voltage V1, and therefore, is improper to accurately detect a peak value of the AC voltage V1. The AC ripple voltage superimposed on the DC input voltage V2 varies according to the secondary-side load current I2, to further deteriorate the input voltage detecting accuracy.

In this way, the low-input protector 200a according to the related art is affected by the fluctuating AC ripple voltage superimposed on the DC input voltage V2 and is incapable of correctly detecting the AC input voltage V1.

On the other hand, the related art of the Japanese Unexamined Patent Application Publication No. 2005-328589 employs two input voltage detectors, i.e., the first and second low-voltage-operation stop circuits, to complicate circuit configuration and increase costs.

According to the present invention, a switching power source apparatus that has a simple circuit configuration, is inexpensive, and is capable of correctly detecting an input voltage irrespective of AC ripple voltage superimposed on the input voltage, thereby realizing accurate low-input protection can be provided.

According to a first aspect of the present invention, provided is a switching power source apparatus including a switching element connected through a primary winding of a transformer to a voltage terminal of a DC input voltage, a rectifying-smoothing circuit configured to rectify and smooth a voltage induced by a secondary winding of the transformer and provide a DC output voltage, a control circuit for controlling ON/OFF of the switching element, and a delay circuit configured to generate a predetermined delay time. The control circuit is configured to detect the DC input voltage, start a switching operation of the switching element if the DC input voltage has increased to or above a threshold value, and stop the switching operation of the switching element if the DC input voltage is lower than the threshold value and that a period during which the DC input voltage is continuously lower than the threshold value has reached the predetermined delay time generated by the delay circuit.

According to a second aspect of the present invention, the threshold value is a first threshold value and a second threshold value, and the control circuit starts the switching operation of the switching element if the DC input voltage has increased to or above the first threshold value and stops the switching operation of the switching element if the DC input voltage is lower than the second threshold value and that a period during which the DC input voltage is continuously lower than the second threshold value has reached the predetermined delay time generated by the delay circuit.

A third aspect of the present invention provides a switching power source apparatus including an input rectifying-smoothing circuit configured to rectify and smooth an AC voltage from an AC power source and provide a DC input voltage, a switching element connected through a primary winding of a transformer to an output end of the input rectifying-smoothing circuit, an output rectifying-smoothing circuit configured to rectify and smooth a voltage induced by a secondary winding of the transformer and provide a DC output voltage, a control circuit for controlling ON/OFF of the switching element, and a delay circuit configured to generate a predetermined delay time. The control circuit is configured to detect a peak value of the AC voltage from the AC power source, start a switching operation of the switching element if the peak value of the AC voltage has increased to or above a threshold value, and stop the switching operation of the switching element if the peak value of the AC voltage is lower than the threshold value and that a period during which the peak value is continuously lower than the threshold value has reached the predetermined delay time generated by the delay circuit.

According to a fourth aspect of the present invention, the threshold value of the third aspect consists of a first threshold value and a second threshold value, and the control circuit of the third aspect starts the switching operation of the switching element if the peak value of the AC voltage has increased to or above the first threshold value and stops the switching operation of the switching element if the peak value of the AC voltage is lower than the second threshold value and that a period during which the peak value is continuously lower than the second threshold value has reached the predetermined delay time generated by the delay circuit.

DESCRIPTION OF THE PREFERRED EMBODIMENT

Switching power source apparatuses according to embodiments of the present invention will be explained in detail with reference to the drawings.

First Embodiment

Figure 3:
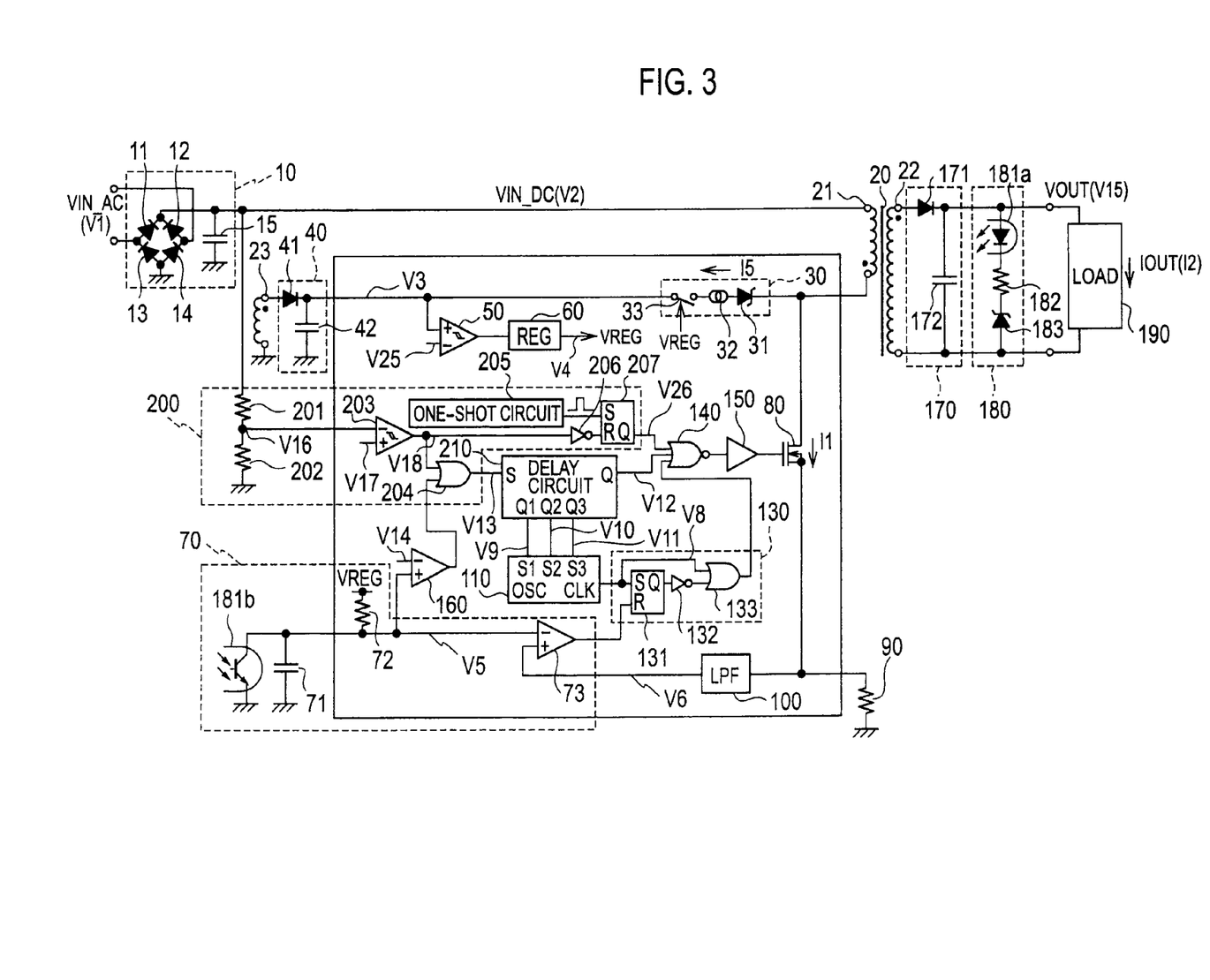
FIG. 3 is a circuit diagram showing a switching power source apparatus according to a first embodiment of the present invention.

FIG. 3 is a circuit diagram showing a switching power source apparatus according to the first embodiment of the present invention. The apparatus includes an input rectifying-smoothing circuit 10, a transformer 20, a primary winding 21, a drive winding 23, a starter 30, a rectifying-smoothing circuit 40, a low-voltage-malfunction preventer 50, a reference voltage circuit 60, a feedback controller 70, a switching element 80, a current detecting resistor 90, a low-pass filter (LPF) 100, a first oscillator 110, a PWM controller 130, a NOR gate 140, a driver 150, a comparator 160, a low-input protective controller 200, a delay circuit 210, a rectifying-smoothing circuit 170, an output voltage detector 180, and a load 190.

The first embodiment of FIG. 3 differs from the related art of FIG. 1 in the circuit configuration of the low-input protective controller 200, delay circuit 210, and NOR gate 140.

Each part of the first embodiment will be explained. The input rectifying-smoothing circuit 10 includes diodes 11 to 14 to rectify an AC voltage V1 of an AC power source and a smoothing capacitor 15 to smooth the rectified voltage and provide a DC input voltage V2. The voltage V2 is supplied through the primary winding 21 of the transformer 20 to the switching element 80.

The switching element 80 is turned on/off to convert the DC input voltage V2 into an AC voltage to transfer energy from the primary side of the transformer 20 to the secondary side thereof. The rectifying-smoothing circuit 170 rectifies and smoothes a voltage generated by a secondary winding 22 of the transformer 20, to supply power to the load 190.

When the DC input voltage V2 increases to a breakdown voltage VBD of a Zener diode 31 in the starter 30, the Zener diode 31 breaks down to pass a starting current I5. The starting current I5 charges a capacitor 42 in the rectifying-smoothing circuit 40, to increase a power source voltage V3.

When the power source voltage V3 reaches a first threshold value V25a of the low-voltage-malfunction preventer 50, the reference voltage circuit (REG) 60 operates to supply a reference voltage V4 to each circuit block, and at the same time, turn off a switch 33 in the starter 30 to stop the starting current I5.

The low-input protective controller 200 includes voltage dividing resistors 201 and 202, a comparator 203, an OR gate 204, a one-shot circuit 205, an inverter 206, and an RS flip-flop 207.

The comparator 203 compares a DC input divided voltage V16 with a threshold value V17. In a low input state or an overload state determined by outputs from the comparators 203 and 160, the OR gate 204 provides a set terminal S of the delay circuit 210 with a high-level timer set signal V13. The inverter 206 inverts an output from the comparator 203 and provides a reset terminal R of the RS flip-flop 207 with the inverted output.

When the power source becomes operative, the one-shot circuit 205 provides a set terminal S of the RS flip-flop 207 with a high-level trigger signal. The RS flip-flop 207 provides a NOR gate 140 with a stop signal V26. The NOR gate 140 operates a NOR function of outputs from the RS flip-flop 207, PWM controller 130, and delay circuit 210.

If the AC voltage V1 is a steady operation voltage, the comparator 203 provides a low-level output, the inverter 206 a high-level output, and the RS flip-flop 207 a low-level output. As a result, the low-input protective controller 200 provides a low-level first stop signal V26 to carry out a switching operation of the switching element 80.

In an OFF period of the switching element 80, the rectifying-smoothing circuit 170 rectifies and smoothes a voltage induced by the secondary winding 22 and generates a DC output voltage V15. At the same time, the drive winding 23 supplies power to the primary-side control circuit to start a steady operation.

The output voltage detector 180 detects the DC output voltage V15 from the rectifying-smoothing circuit 170, compares the DC output voltage V15 with a reference voltage, amplifies a resultant error voltage, and sends the amplified error voltage from a photocoupler 181a to a primary-side photocoupler 181b.

In an ON period of the switching element 80, the switching element 80 passes a triangular current I1. The current I1 is detected as a voltage by the current detecting resistor 90. The low-pass filter 100 passes only a low-frequency component of the detected voltage as an overcurrent signal V6 to a comparator 73 in the feedback controller 70.

The feedback controller 70 generates a control voltage V5 according to the amplified error signal from the output voltage detector 180. The comparator 73 compares the control voltage V5 with the overcurrent signal V6. If the overcurrent signal V6 is equal to or greater than the control voltage V5, the comparator 73 provides the PWM controller 130 with an OFF trigger signal for the switching element 80, thereby performing PWM control of the switching element 80.

The comparator (overload detector) 160 compares the control voltage V5 with an overcurrent threshold value V14. The control voltage V5 increases in proportion to an increase in a load current I2. If the control voltage V5 reaches the overcurrent threshold value V14, the comparator 160 determines that it is an overload state and supplies a timer set signal V13 through the OR gate 204 to the set terminal S of the delay circuit 210.

According to the timer set signal V13 from the comparator 160, the delay circuit 210 provides a delay pulse defining a delay time according to internal counters, and when the period of the overload state reaches the delay time, outputs a second stop signal V12 to the NOR gate 140, to stop the switching operation of the switching element 80, thereby protecting the switching power source apparatus from the overload state.

Operation of the delay circuit 210 will be explained in detail with reference to a detailed circuit diagram of FIG. 4 and a timing chart of FIG. 6.

Figure 4:
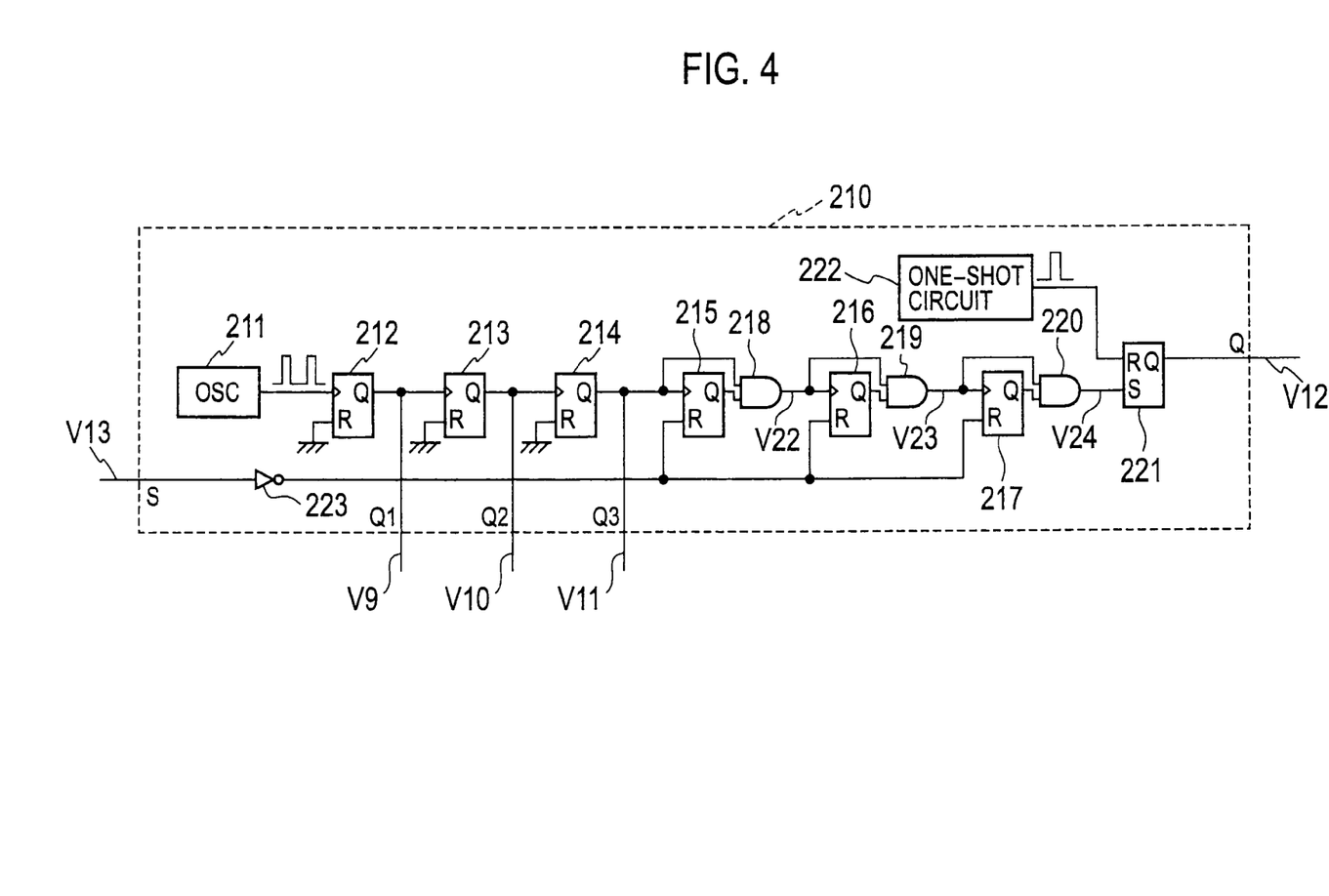
FIG. 4 is a circuit diagram showing a delay circuit arranged in the apparatus of FIG. 3.

In FIG. 4, the delay circuit 210 includes cascaded counters 212 to 217, a second oscillator 211 to supply a clock signal to the counter 212, AND gates 218 to 220 provided for the counters 215 to 217, respectively, an RS flip-flop 221, a one-shot circuit 222 to provide a reset terminal R of the RS flip-flop 221 with a high-level trigger signal at the start of the power source, and an inverter 223 connected to reset terminals R of the counters 215 to 217.

The counters 212 to 214 are always in a set state (the reset terminals R thereof being grounded), to receive the clock signal from the second oscillator 211 and always supply a clock signal to a clock input terminal of the counter 215. At the same time, the counters 212 to 214 supply control signals V9, V10, and V11 to digital signal input terminals of the first oscillator 110.

Figure 6:
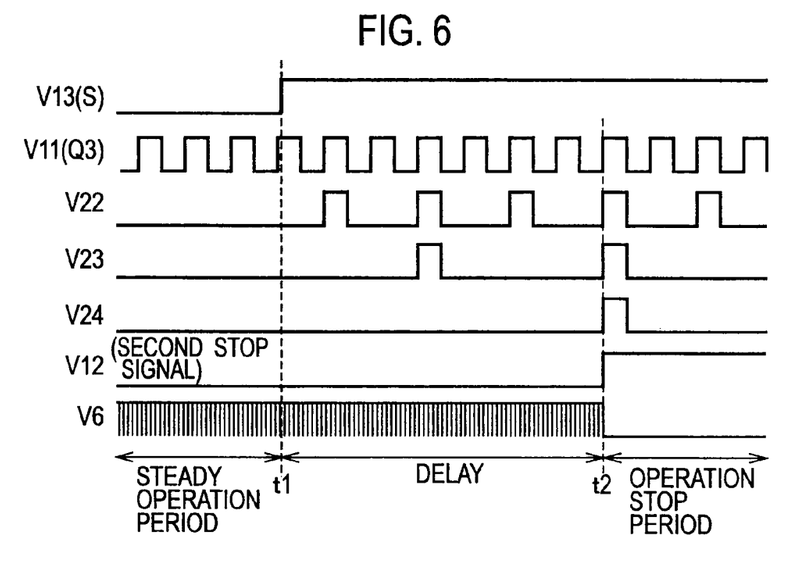
FIG. 6 is a timing chart showing an operation of the delay circuit of FIG. 4.

In an overload state or a low input voltage state, the timer set terminal voltage V13 changes from low to high at t1 of FIG. 6. Then, the inverter 223 inverts the high-level timer set terminal voltage V13 into a low level signal, which is supplied to the counters 215, 216, and 217.

In response to the low-level signal from the inverter 223 supplied to the reset terminals R of the counters 215, 216, and 217, these counters start to count.

When a counter output V24 supplied to a set terminal S of the RS flip-flop 221 changes from low to high (t2 of FIG. 6), the RS flip-flop 221 supplies a high-level second stop signal V12 to the NOR gate 140. A period between t1 and t2 of FIG. 6 is the predetermined delay time generated by the delay circuit 210.

Based on the digital input signals V9, V10, and V11 from the delay circuit 210, the first oscillator 110 generates a clock signal V8 (an ON trigger signal for the switching element 80). The oscillation frequency of the clock signal V8 changes as time passes. The clock signal V8 is sent to a clock input terminal of the PWM controller 130.

The PWM controller 130 includes an RS flip-flop 131, an inverter 132, and an OR gate 133. According to the clock signal V8, the PWM controller 130 controls ON timing of the switching element 80 through the NOR gate 140 and driver 150. Namely, the PWM controller 130 changes the oscillation frequency of the switching element 80 in every oscillation period, to disperse noise generated by the switching operation of the switching element 80.

Figure 5:
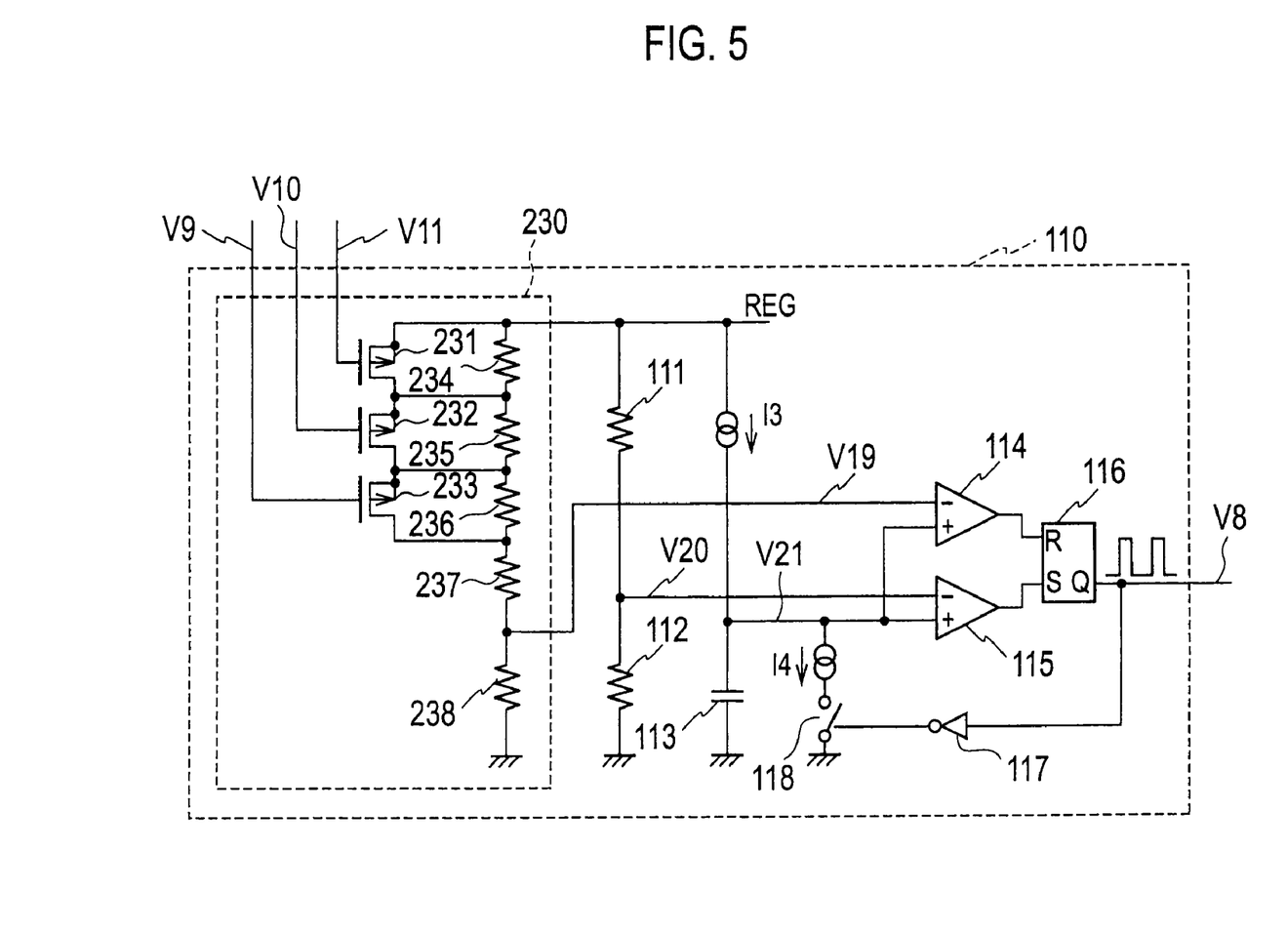
FIG. 5 is a circuit diagram showing a first oscillator arranged in the apparatus of FIG. 3.
Figure 7:
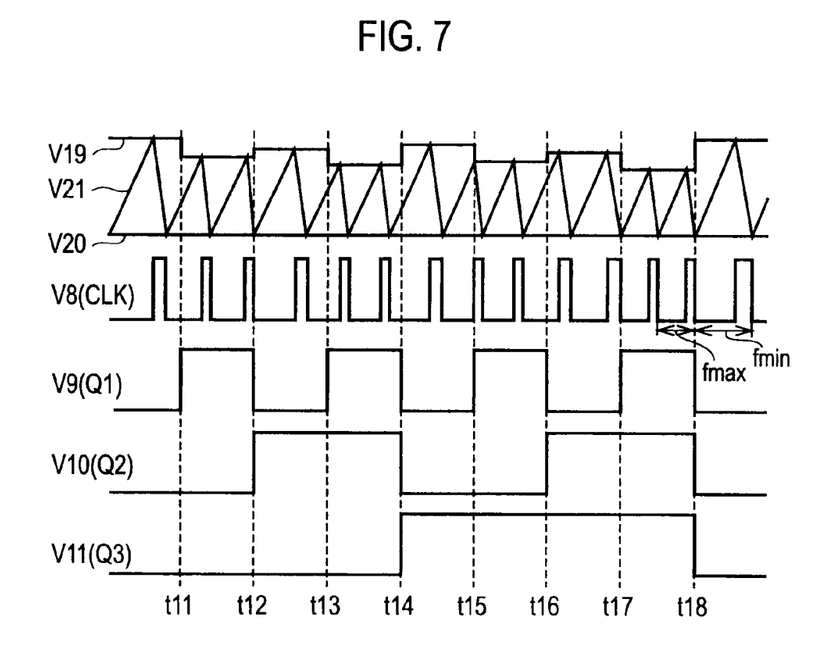
FIG. 7 is a timing chart showing an operation of the first oscillator of FIG. 5.

Operation of the first oscillator 110 will be explained in detail with reference to a detailed circuit diagram of FIG. 5 and a timing chart of FIG. 7.

The first oscillator 110 includes a D/A converter 230. The D/A converter 230 includes p-type MOSFETs 231 to 233 those are connected in series, a voltage dividing resistor 234 connected between the drain and source of the MOSFET 231, a voltage dividing resistor 235 connected between the drain and source of the MOSFET 232, a voltage dividing resistor 236 connected between the drain and source of the MOSFET 233, and voltage dividing resistors 237 and 238. The source power REG is applied to ends of the series connected voltage dividing resistors 234 to 238.

According to the digital input signals V9, V10, and V11 from the delay circuit 210, the DA converter 230 turns on/off the MOSFETs 231, 232, and 233 to thereby make the resistors 234, 235, and 236 conductive/nonconductive. This results in changing a voltage dividing resistance ratio to generate a first threshold value V19. Namely, the first threshold value V19 temporally changes.

Voltage dividing resistors 111 and 112 divide the source power REG and provide a second threshold value V20. A capacitor 113 is charged at a constant current by a constant current source I3, to generate a sawtooth voltage wave V21.

A first comparator 114 compares the capacitor voltage V21 of the capacitor 113 with the temporally changing first threshold value V19. When the capacitor voltage V21 becomes equal to or larger than the first threshold value V19, the first comparator 114 provides a reset terminal R of an RS flip-flop 116 with a high-level trigger signal. As a result, the RS flip-flop 116 provides a low-level clock output V8. An inverter 117 inverts the low-level clock output V8 into a high-level signal to turn on a switch 118, so that a constant current source I4 discharges the capacitor 113 through the switch 118.

Thereafter, the capacitor 113 is discharged with a differential current between the constant current of the constant current source I4 and the constant current of the constant current source I3. A second comparator 115 compares the capacitor voltage V21 with the second threshold value V20. When the capacitor voltage V21 becomes equal to or lower than the second threshold value V20, the second comparator 115 provides a set terminal S of the RS flip-flop 116 with a high-level trigger signal. As a result, the RS flip-flop 116 provides a high-level clock output V8.

The inverter 117 inverts the high-level clock output V8 into a low-level signal to turn off the switch 118. This results in charging the capacitor 113. Repetition of these actions generates the clock signal V8 that temporally changes.

A series of above-mentioned operations changes the oscillation frequency of the switching element 80 every oscillation period according to the clock signal V8, to average noise generated by the switching operation of the switching element 80 and reduce a noise peak level.

Figure 8:
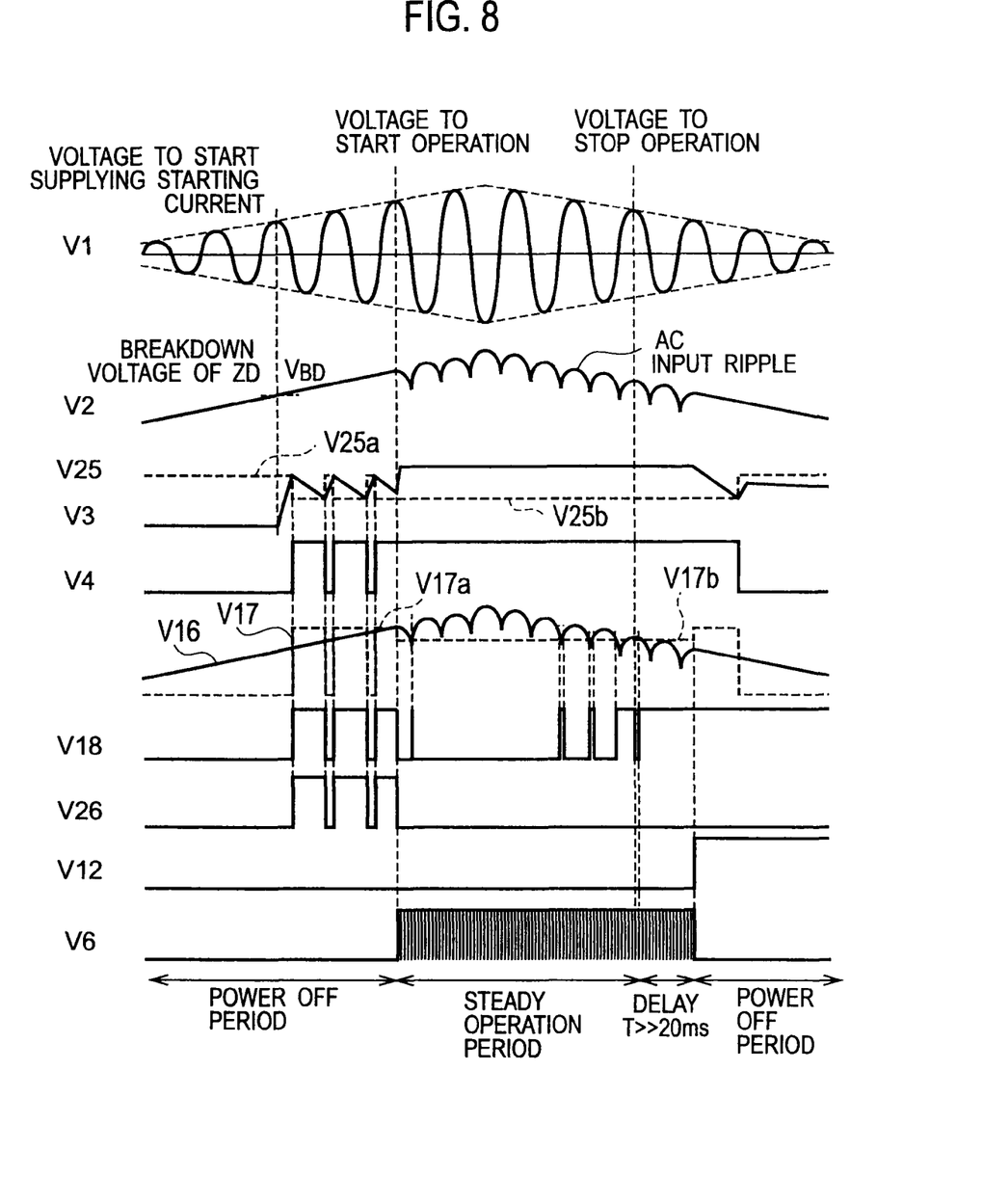
FIG. 8 is a timing chart showing an input detecting operation of the apparatus of FIG. 3.

Operation of the low-input protective controller 200 will be explained in detail with reference to the circuit diagram of FIG. 3 and a timing chart of FIG. 8.

Operation of the low-input protective controller 200 when the AC voltage V1 increases from a low state will be explained. As the AC voltage V1 increases, the DC input voltage V2 increases. When the DC input voltage V2 reaches the breakdown voltage VBD of the Zener diode 31 in the starter 30, the Zener diode 31 breaks down to pass the starting current I5. The starting current I5 charges the smoothing capacitor 42 in the rectifying-smoothing circuit 40, to increase the power source voltage V3.

When the power source voltage V3 reaches the first threshold value V25a of the low-voltage-malfunction preventer 50, the reference voltage circuit 60 supplies the reference voltage V4 to each block. The reference voltage V4 activates the primary-side control circuit and turns off the switch 33 in the starter 30 to stop the starting current I5.

At this time, the comparator 203 compares the DC input divided voltage V16 formed by dividing the DC input voltage V2 by the voltage dividing resistors 201 and 202 with the first threshold value V17a. If the DC input divided voltage V16 is lower than the first threshold value V17a, the RS flip-flop 207 provides the NOR gate 140 with a high-level first stop signal V26 to put the switching element 80 in an OFF state.

The drive winding 23 supplies no bias, and therefore, the power source voltage V3 decreases. When the power source voltage V3 decreases below the second threshold value V25b of the low-voltage-malfunction preventer 50, the starter 30 again operates to increase the power source voltage V3.

Thereafter, the AC voltage V1 further increases and the starting current I5 again charges the capacitor 42. As a result, the power source voltage V3 reaches the first threshold value V25a of the low-voltage-malfunction preventer 50. At this time, if the DC input divided voltage V16 is equal to or larger than the first threshold value V17a, the comparator 203 determines that it is a steady input state and provides the OR gate 204 and inverter 206 with a low-level signal. As a result, the timer set terminal S of the delay circuit 210 receives a low-level signal, and therefore, the delay circuit 210 does not generate a delay pulse.

The inverter 206 inverts the low-level signal from the comparator 203 into a high-level signal, which is supplied to the reset terminal R of the RS flip-flop 207. As a result, the first stop signal V26 changes from high to low and the NOR gate 140 provides a high-level signal to start the switching operation of the switching element 80.

Operation of the low-input protective controller 200 when the AC voltage V1 decreases from a high state will be explained. In the steady operation, the DC input voltage V2 involves superimposed AC ripple voltage that varies in response to the load current I2 and is synchronous with a period of the AC voltage V1. The inverting input terminal of the comparator 203 receives the DC input divided voltage V16 containing a component of the AC ripple voltage.

When the DC input divided voltage V16 decreases below a threshold value V17b of the comparator 203, the comparator 203 provides the OR gate 204 with a high-level voltage V18. In response to the high-level signal from the comparator 203, the OR gate 204 supplies a high-level timer set signal V13 to the set terminal S of the delay circuit 210.

Then, the delay circuit 210 provides a delay pulse defining a delay time sufficiently longer than a period of 20 ms of the commercial AC power source. If a period during which the DC input divided voltage V16 is continuously lower than the threshold value V17b is equal to or longer than the delay time, i.e., if the high-level timer set signal V13 is supplied for the delay time to the RS flip-flops 215, 216, and 217 of the delay circuit 210, the delay circuit 210 determines that it is a low-input state and outputs a high-level second stop signal V12 to the NOR gate 140, to stop the switching operation of the switching element 80.

If the period during which the DC input divided voltage V16 is continuously lower than the threshold value V17b is shorter than the delay time, i.e., if a low-level timer set signal V13 is supplied to the RS flip-flops 215, 216, and 217 of the delay circuit 210 within the delay time, the AND gates 218 to 220 of the delay circuit 210 each provide a low-level output and a low-level signal is supplied to the set terminal S of the RS flip-flop 221 of the delay circuit 210. Accordingly, the delay circuit 210 does not supply the high-level second stop signal V12 to the NOR gate 140.

In this way, when the AC voltage V1 decreases from a high state, the delay circuit 210 is enabled to accurately detect a voltage proportional to a peak value of the AC voltage V1 without affected by AC ripple voltage superimposed on the DC input voltage V2 and surely stop the switching operation of the switching element 80.

When the AC voltage V1 increases from a low state, the delay circuit 210 is disabled, and therefore, the switching operation of the switching element 80 starts within the delay time, thereby preventing the DC output voltage V15 from erroneously increasing. Consequently, the low-input protective controller 200 can accurately detect the level of an input voltage irrespective of fluctuations in the load current I2.

The low-input protective controller 200 needs no smoothing capacitor required by the related art and can share the delay circuit with the existing overload protector and oscillator, to greatly reduce a circuit scale. This results in reducing the cost and space of the switching power source apparatus.

Second Embodiment

Figure 9:
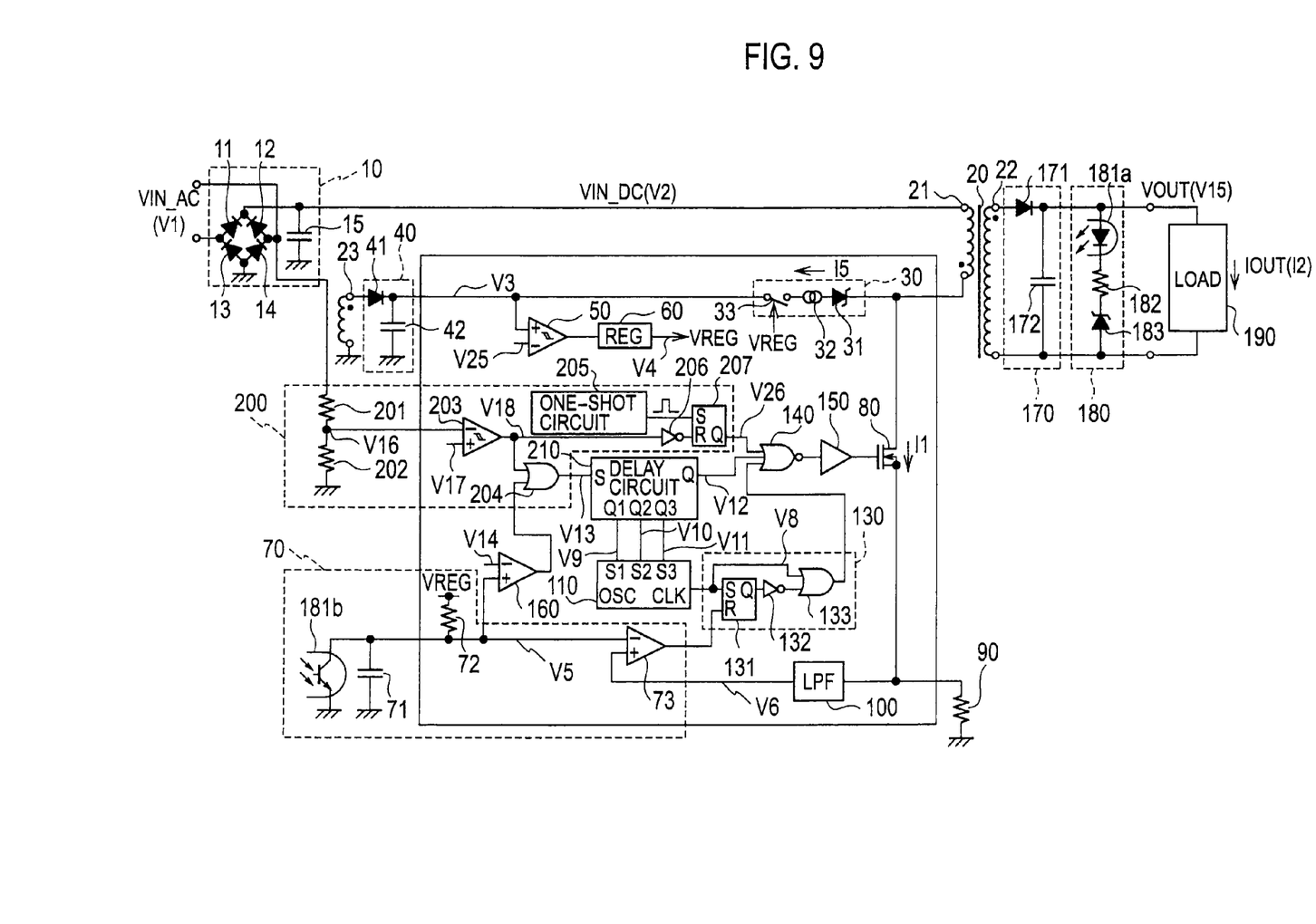
FIG. 9 is a circuit diagram showing a switching power source apparatus according to a second embodiment of the present invention.

FIG. 9 is a circuit diagram showing a switching power source apparatus according to the second embodiment of the present invention. The second embodiment of FIG. 9 differs from the first embodiment of FIG. 3 in that the second embodiment directly connects an input terminal of a voltage dividing resistor 201 to a voltage terminal of an AC voltage source and a connection point between diodes 12 and 14. The other parts of FIG. 9 are the same as those of FIG. 3, and therefore, are represented with the same reference marks.

According to the second embodiment of FIG. 9, the voltage dividing resistors 201 and 202 divide an AC voltage and provide a half-wave-rectified voltage to an inverting terminal of a comparator 203 so that the comparator 203 detects a peak value of the AC voltage. This configuration realizes a low-input protecting function like the first embodiment.

To detect an AC voltage, a power loss of the voltage dividing resistors 201 and 202 according to the second embodiment of FIG. 9 is equal to an averaged AC loss which is about $1/\lambda$ ($\approx 31.8\%$) of the first embodiment of FIG. 3 that detects a DC voltage. The second embodiment, therefore, is effective to reduce the standby power consumption of the switching power source apparatus.

Third Embodiment

Figure 10:
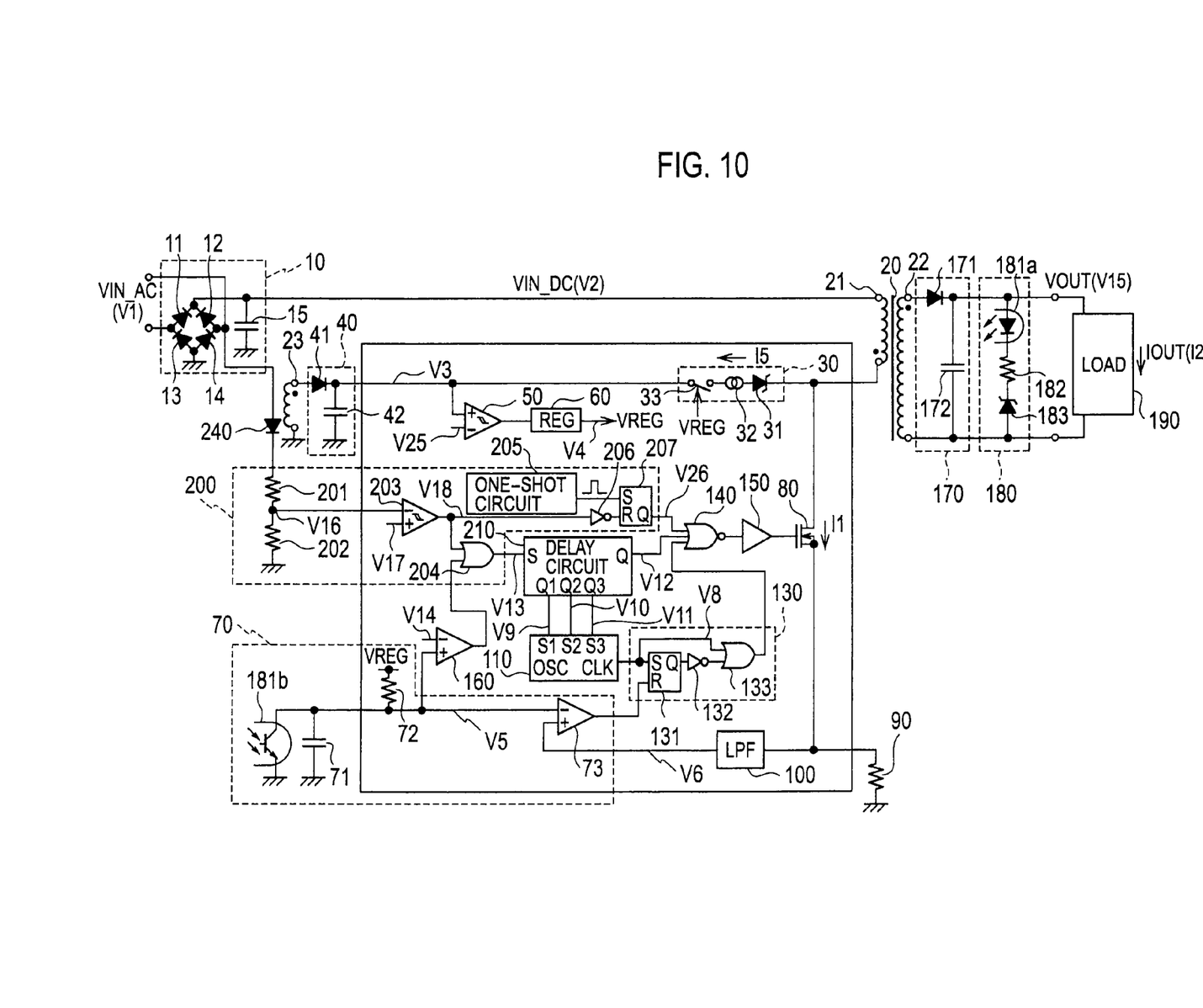
FIG. 10 is a circuit diagram showing a switching power source apparatus according to a third embodiment of the present invention.

FIG. 10 is a circuit diagram showing a switching power source apparatus according to the third embodiment of the present invention. The third embodiment of FIG. 10 differs from the second embodiment of FIG. 9 in that the third embodiment connects a diode 240 between a connection point of diodes 12 and 14 and an input terminal of a voltage dividing resistor 201. The other parts of FIG. 10 are the same as those of FIG. 9, and therefore, are represented with the same reference marks.

According to the third embodiment of FIG. 10, the diode 240 half-wave-rectifies an AC voltage V1 and the voltage dividing resistors 201 and 202 divide the half-wave-rectified voltage to provide a half-wave divided voltage, which is supplied to an inverting terminal of a comparator 203 so that the comparator 203 detects a peak value of the AC voltage. This configuration also realizes a low-input protecting function. Like the second embodiment of FIG. 9, the third embodiment can reduce the standby power consumption of the switching power source apparatus.

Effect of the Present Invention will be Summarized.

According to the present invention, the controller (200) detects a DC input voltage. If the DC input voltage is equal to or larger than a threshold value, the controller starts a switching operation of the switching element. If the DC input voltage is lower than the threshold value and if a period during which the DC input voltage is continuously lower than the threshold value reaches a predetermined delay time generated by the delay circuit, the controller stops the switching operation of the switching element.

When an AC voltage decreases from a high state, the predetermined delay time is set to be longer than, for example, a period of a commercial power source, to correctly detect the AC voltage irrespective of AC ripple voltage superimposed on the DC input voltage and surely stop the switching operation.

When the AC voltage increases from a low state, the switching operation is started within the delay time without generating the predetermined delay time, to prevent an output voltage on the secondary side from erroneously increasing. In this way, the low-input protective controller according to the present invention is accurate because the detection level of an input voltage thereof is not affected by AC ripple voltage superimposed on DC input voltage. Unlike the low-input protector of the related art that needs a smoothing capacitor, the low-input protective controller of the present invention needs no such smoothing capacitor, and therefore, the switching power source apparatus of the present invention is simple and inexpensive.

This application claims benefit of priority under 35 USC §119 to Japanese Patent Applications No. 2007-271250, filed on Oct. 18, 2007, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus comprising:
a switching element connected through a primary winding of a transformer to a voltage terminal of a DC input voltage;
a rectifying-smoothing circuit configured to rectify and smooth a voltage induced by a secondary winding of the transformer and provide a DC output voltage;
a control circuit for controlling ON/OFF of the switching element; and
a delay circuit configured to generate a predetermined delay time, wherein
the control circuit is configured to:
detect the DC input voltage;
start a switching operation of the switching element if the DC input voltage has increased to or above a threshold value; and
stop the switching operation of the switching element if the DC input voltage is lower than the threshold value and that a period during which the DC input voltage is continuously lower than the threshold value has reached the predetermined delay time generated by the delay circuit.

2. The switching power source apparatus of claim 1, wherein:
the threshold value includes a first threshold value and a second threshold value; and the control circuit starts the switching operation of the switching element if the DC input voltage has increased to or above the first threshold value and stops the switching operation of the switching element if the DC input voltage is lower than the second threshold value and that a period during which the DC input voltage is continuously lower than the second threshold value has reached the predetermined delay time generated by the delay circuit.

3. The switching power source apparatus of claim 1, further comprising an overload detector connected to an input end of the delay circuit, configured to detect whether or not a load is in an overload state, wherein the control circuit stops the switching operation of the switching element if the overload detector detects an overload state and if a period during which the overload state is continuously detected has reached the predetermined delay time generated by the delay circuit.

4. The switching power source apparatus of claim 1, further comprising an oscillator connected to a digital output terminal of the delay circuit, configured to generate a signal whose oscillation frequency changes stepwise in response to a digital output signal from the delay circuit.

5. A switching power source apparatus comprising:

an input rectifying-smoothing circuit configured to rectify and smooth an AC voltage from an AC power source and provide a DC input voltage;

a switching element connected through a primary winding of a transformer to an output end of the input rectifying-smoothing circuit;

an output rectifying-smoothing circuit configured to rectify and smooth a voltage induced by a secondary winding of the transformer and provide a DC output voltage;

a control circuit for controlling ON/OFF of the switching element; and a delay circuit configured to generate a predetermined delay time, wherein the control circuit is configured to:
  detect a peak value of the AC voltage from the AC power source;
  start a switching operation of the switching element if the peak value of the AC voltage has increased to or above a threshold value; and
  stop the switching operation of the switching element if the peak value of the AC voltage is lower than the threshold value and that a period during which the peak value is continuously lower than the threshold value has reached the predetermined delay time generated by the delay circuit.

6. The switching power source apparatus of claim 5, wherein:

the threshold value includes a first threshold value and a second threshold value; and the control circuit starts the switching operation of the switching element if the peak value of the AC voltage has increased to or above the first threshold value and stops the switching operation of the switching element if the peak value of the AC voltage is lower than the second threshold value and that a period during which the peak value is continuously lower than the second threshold value has reached the predetermined delay time generated by the delay circuit.

7. The switching power source apparatus of claim 5, further comprising an overload detector connected to an input end of the delay circuit, configured to detect whether or not a load is in an overload state, wherein the control circuit stops the switching operation of the switching element if the overload detector detects an overload state and if a period during which the overload state is continuously detected has reached the predetermined delay time generated by the delay circuit.

8. The switching power source apparatus of claim 5, further comprising an oscillator connected to a digital output terminal of the delay circuit, configured to generate a signal whose oscillation frequency changes stepwise in response to a digital output signal from the delay circuit.

9. The switching power source apparatus of claim 5, wherein the delay time generated by the delay circuit is longer than a period of the AC voltage from the AC power source.

10. The switching power source apparatus of claim 5, further comprising a rectifier configured to half-wave-rectify the AC voltage from the AC power source, wherein the control circuit detects a peak value of the AC voltage through the rectifier.

* * * * *